United States Patent [19]

Kikukawa et al.

[11] 4,001,780
[45] Jan. 4, 1977

[54] DATA READING APPARATUS

[75] Inventors: Tsuyoshi Kikukawa; Tsutomu Hashimoto, both of Amagasaki, Japan

[73] Assignee: Mitsubishi Denki Kabushiki Kaisha, Tokyo, Japan

[22] Filed: July 23, 1975

[21] Appl. No.: 598,237

[30] Foreign Application Priority Data

| Aug. 21, 1974 | Japan | 49-95879 |
| Jan. 8, 1975 | Japan | 50-4776 |
| Jan. 8, 1975 | Japan | 50-4777 |
| Jan. 8, 1975 | Japan | 50-4778 |

[52] U.S. Cl. .................. 340/146.3 D; 340/146.3 Z
[51] Int. Cl.$^2$ ......................................... G06K 9/04
[58] Field of Search ............ 340/146.3 D, 146.3 R, 340/146.3 Z; 178/7.7

[56] References Cited

UNITED STATES PATENTS

| 3,868,634 | 2/1975 | Dolch | 178/7.7 |
| 3,902,047 | 8/1975 | Tyler et al. | 178/7.7 |
| 3,930,230 | 12/1975 | Stephens | 340/146.3 D |

Primary Examiner—Joseph M. Thesz
Attorney, Agent, or Firm—Oblon, Fisher, Spivak, McClelland & Maier

[57] ABSTRACT

A data reading apparatus includes a TV camera with a deflecting mechanism for reading codified data. The scanning direction of the TV camera is rotated by using the deflecting mechanism.

3 Claims, 11 Drawing Figures

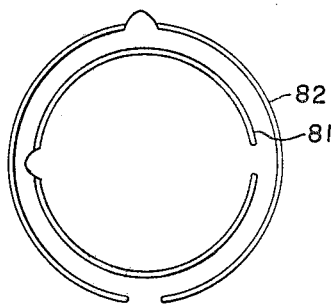
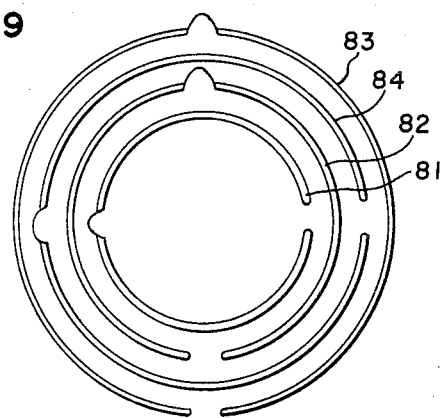
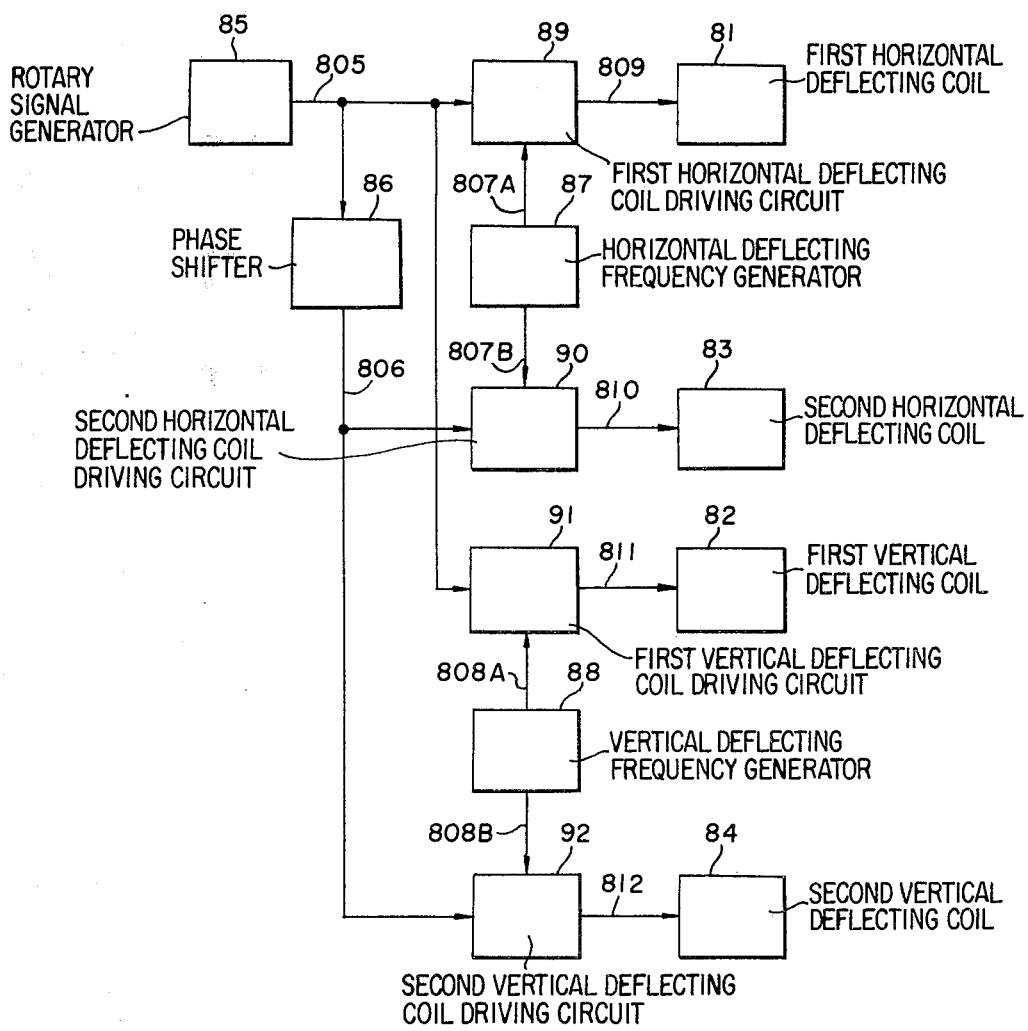

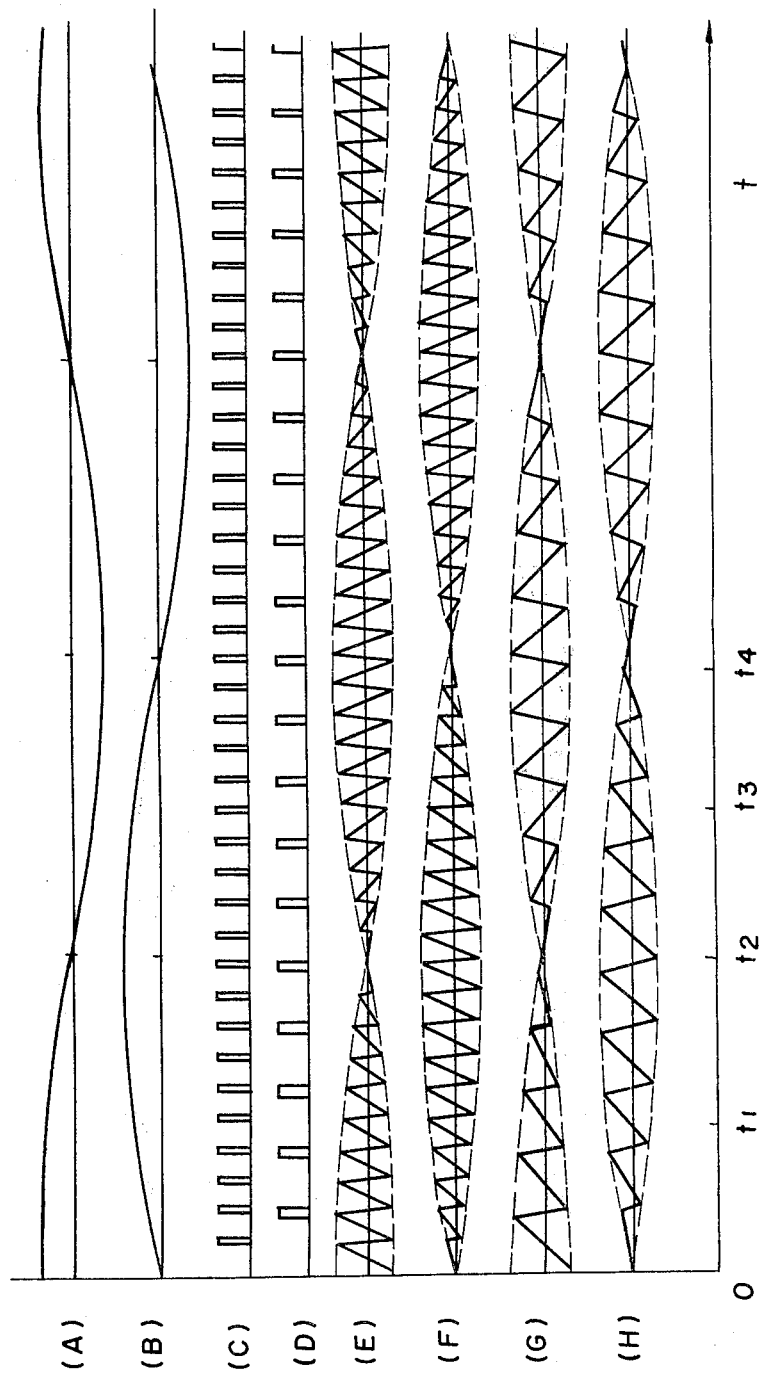

DATA READING APPARATUS

BACKGROUND OF THE INVENTION

1. Field of the Invention

The present invention relates to a data reading apparatus wherein the relative position between a TV camera and a tag is maintained constant and a deflecting coil of the TV camera is mechanically rotated or a signal which is equivalent to the mechanical rotation of a deflecting coil is applied to the deflecting coil whereby the tag having bar codes in discretional directions is read by the TV camera.

2. Description of the Prior Art

In apparatus for reading out the data of tags written by bar codes or in a special font, wherein the tags are attached to commodities or the like, the plane of the target of the TV camera is disposed substantially parallel to a plane of the tag at a constant distance to the plane of the tag. However, the direction is dependent upon the position of the commodity. In order to read out the data of bar codes having non-concentric circles which are written on tags, it is necessary to arrange the direction so as to scan all the data by at least one scanning line.

In order to arrange this, the following methods can be considered, though they are disadvantageous.

1. The direction of a camera is varied by rotation of the camera. An image on the target of the TV camera is rotated. Accordingly, the after-image phenomenon of the video tube of the TV camera prevents high speed rotation whereby high speed read-out is prevented.

2. A direction of an image on a target of the TV camera is varied by rotation of a prism. Here, high speed read-out is prevented because of a similar reason.

SUMMARY OF THE INVENTION

Accordingly, it is an object of the invention to provide data reading apparatus having high read-out speed which reads out data of bar codes and the like on tags which are disposed in a discretional direction wherein the relative position between the TV camera and the tags are maintained constant and a deflecting coil of the TV camera is mechanically rotated.

It is another object of the invention to provide data reading apparatus having high read-out speed wherein the relative position between the TV camera and the tags are maintained constant and a signal which is equivalent to the mechanical rotation of a deflecting coil is applied to the deflecting coil.

The foregoing and other objects are attained in accordance with one aspect of the present invention through the provision of a data reading apparatus comprising a TV camera having a deflecting mechanism for reading codified data, means for rotating the scanning direction of the TV camera using the deflecting mechanism.

BRIEF DESCRIPTION OF THE DRAWINGS

Various objects, features and attendant advantages of the present invention will be more fully appreciated as the same becomes better understood from the following detailed description when considered in connection with the accompanying drawings, in which:

FIG. 8 is a view showing vertical and horizontal deflecting coils of the conventional TV camera;

FIG. 9 is a view showing the deflecting coils according to the invention;

FIG. 10 is a block diagram of a deflecting signal generating circuit for feeding signals to the deflecting coils of FIG. 9; and FIG. 11 shows waveforms in certain positions of the deflecting signal generating circuit of FIG. 10.

DETAILED DESCRIPTION OF THE PREFERRED EMBODIMENTS

Figure 1:
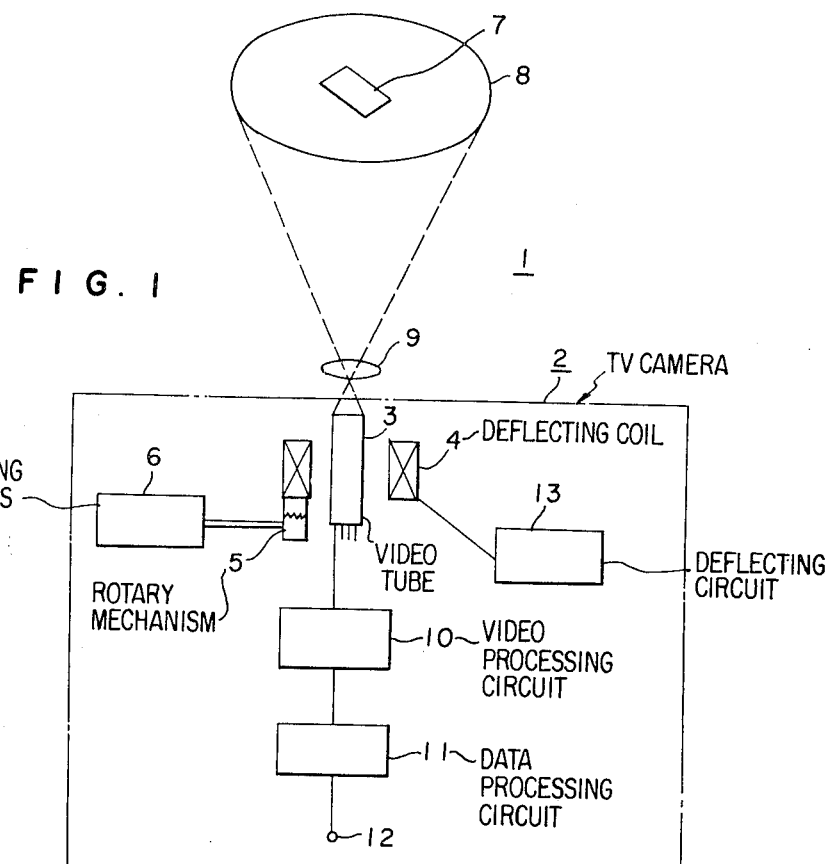
FIG. 1 is a schematic view of data reading apparatus according to the invention having a driving device for rotating a deflecting coil of the TV camera and a deflecting circuit for feeding a signal to the deflecting coil.

Referring now to the drawings, wherein like reference numerals designate identical or corresponding parts throughout the several views, and more particularly to FIG. 1 thereof, in FIG. 1, the data reading apparatus 1 comprises a video tube 3 of a TV camera 2, a deflecting coil 4 connected to the video tube 3, a rotary mechanism 5 for mechanically rotating the deflecting coil 4 about the video tube 3 as the central axis, and a driving means 6 for driving the rotary mechanism 5.

The read-out data can be prices of commodities and reference numbers of commodities written on the tags 7 which are attached to the commodities. These prices and reference numbers are codified and printed by bar codes or special font.

The commodity having the tag 7 is placed on a tag read-out window 8 and the data of the tag 7 written by the bar code is optically focused through a lens system 9 on the target of the video tube 3. The image of the data of the tag 7 on the target is scanned using a linear progressive rotary scan by a rotary mechanism 5 connected to a driving power source 6 by applying a deflecting signal from a deflecting circuit 13 to a deflecting coil 4 to read out the optical data as electrical data.

The data on the tag 7 read from the video tube 3 as electrical data are applied to the video processing circuit 10 and converted to a suitable electrical signal. The output signal of the video processing circuit 10 is input to a data processing circuit 11 to identify the data of the tag 7, to process the data by code conversion and to output the processed signal on output terminal 12.

Figure 2:
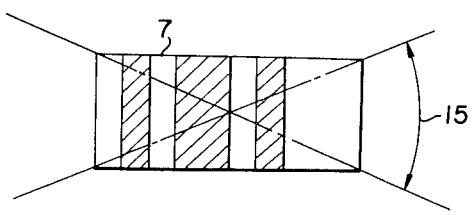
FIG. 2 shows the relation between an image of a tag on a video tube of the TV camera and a scanning line.

The operation of one embodiment of the data reading apparatus of the invention using the bar code as the data of the tag 7 will now be described. The commodity having the tag 7 is placed on the tag read-out window 8 so as to read out the surface of the tag 7. Since the deflecting coil 4 is rotated by the driving power source 6 and the rotary mechanism 5 in the TV camera 2, when the scanning line is placed at the position for scanning the whole length of the bar code, that is to the range of the arrow lines 15 of FIG. 2, the read-out data is considered to be true and the data is processed in the data processing circuit 11.

A start mark and a stop mark are respectively formed at a beginning and an end of the bar code. The data marks such as the price and reference number of the commodity are printed between the marks. Accordingly, when the start mark and the stop mark are read out by one scan, the data mark is considered to be accurately read out and the data mark is processed as the needed data. When the data of the tag 7 is shown by special font, the start mark and the stop mark are also provided for read-out.

Another embodiment of the invention will now be described. As stated above, the deflecting coil 4 provided for the video tube 3 is mechanically rotated by the driving power source 6 and the rotary mechanism 5 to effect a linear progressive rotary scan of the target of the video tube 3.

In another embodiment, the driving power source 6 and the rotary mechanism 5 of FIG. 1 are eliminated and the deflecting coil shown in FIG. 1 is fixed to the video tube 3 and a signal equivalent to the mechanical rotation of the deflecting coil 4 is applied to the deflecting coil.

The circuit for generating the signal fed to the deflecting coil will now be described. In order to attain a deflection similar to the deflection obtained by the mechanical rotation of the deflecting coil by the signal, the deflection for progressively turning the direction of the scanning line can be provided for horizontal deflection and the deflection for progressively turning the direction of scanning line with a phase difference of 90° to the horizontal deflection can be provided for the vertical deflection. The details of this embodiment will be described hereinafter.

It is necessary to use a deflecting circuit for progressively turning the direction of the scanning line. In order to progressively turn the direction of the deflection in a linear fashion, the deflecting current having a waveform shown in FIG. 5(H) (which results from a balanced modulation of a saw-tooth wave by a sine wave) can be fed to one of the deflecting coils and a signal having a 90° phase shift to that of the deflecting current can be fed to the other deflecting coil. Thus, it is necessary to provide a circuit for progressively varying the value of deflection in sine wave form.

Another embodiment of a deflecting circuit which effectively operates in high frequency bands (about the horizontal deflecting frequency of a T.V.) will now be described. In a conventional TV camera having a deflection of constant amplitude and constant direction, a circuit utilizing the switching characteristic of a transistor and the resonance of a deflecting coil is used as a horizontal deflection circuit as shown in FIG. 3.

Figure 3:
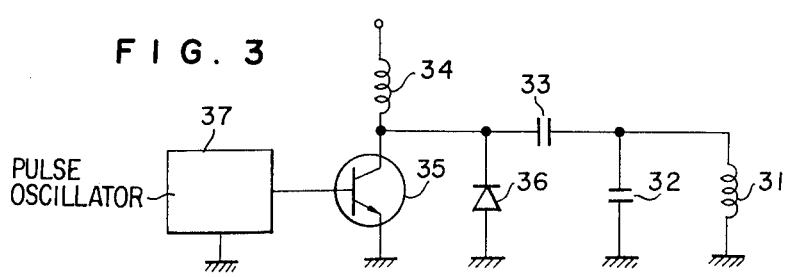
FIG. 3 is a circuit diagram of a conventional horizontal deflection circuit.

In the circuit of FIG. 3, the resonance circuit comprising a deflecting coil 31 and a capacitor 32 is connected through a choke coil 34 and a coupling capacitor 33 to a power source. The contact between the choke coil 34 and the coupling capacitor 33 is connected to a collector of a transistor 35 and is turned on and off by the output of a pulse oscillator 37 applied to the base of transistor 35. In order to form a saw-tooth waveform having the desired linearity for current passing through the deflecting coil 31, it is preferable to insert a diode 36 for passing reverse current to increase the ratio of inductance to resistance of the deflecting coil 31 and to decrease the ON resistance of the transistor 35 and the diode 36.

In order to form the signal for deflection by the circuit of FIG. 3, the voltage of the power source is varied depending upon the deflection and the current of the deflecting coil is switched to pass in the reverse direction when the direction of deflection is reversed. When a relay is used to switch the polarity of the deflection coil, it takes about 10 ms of switching time and it is hard to realize a desirable deflection because of absence and disturbance of the scanning signal at the time the continuous signal is switched.

In a method for switching the polarity of the deflecting coil by inserting a transistor switch or the like between both ends of the deflecting coil, the resistance of the resistor connected in series to the deflecting coil is important compared to the linearity of the deflection and is preferably small in the case of the generation of a horizontal scanning signal.

Figure 4:
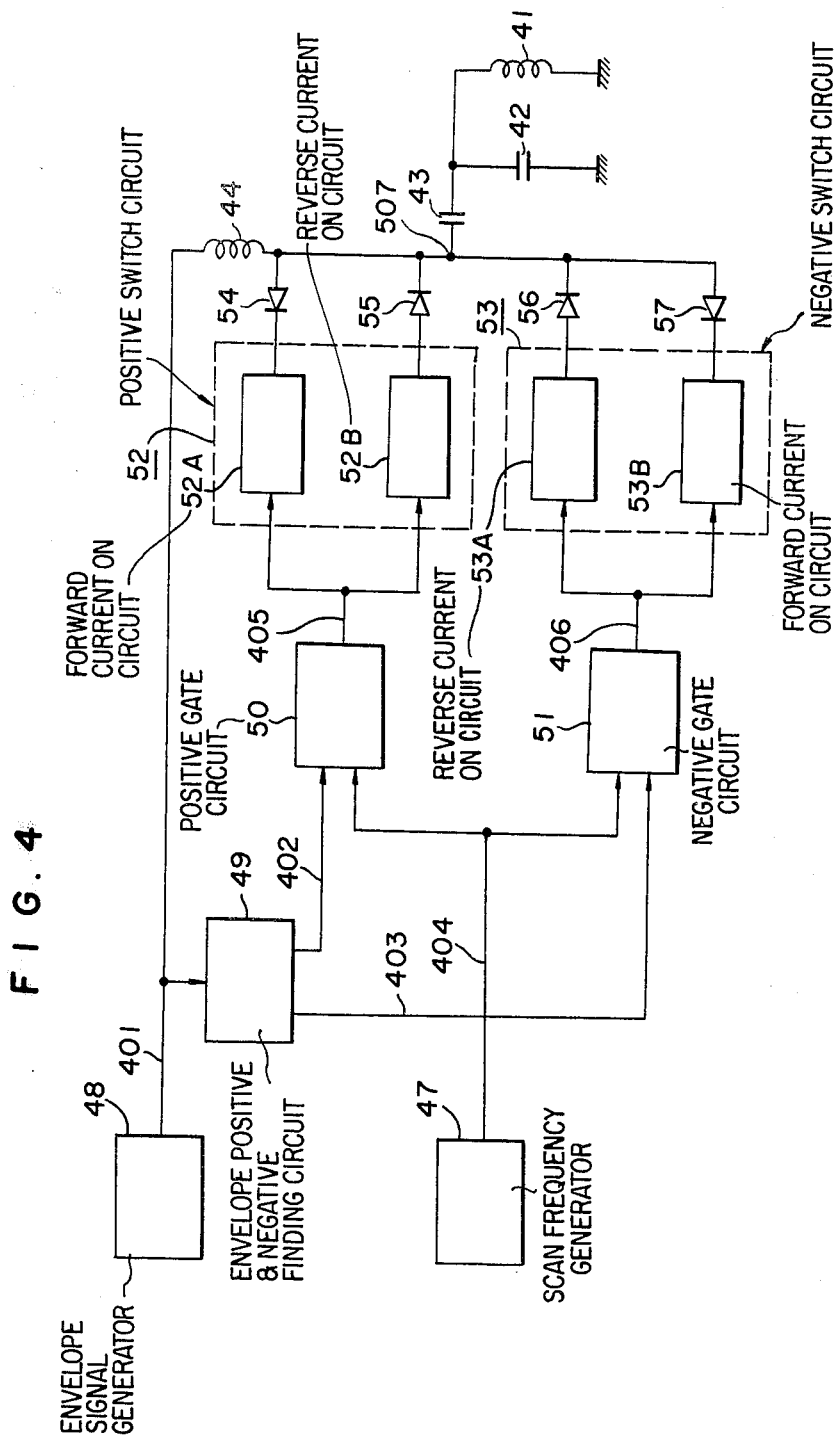
FIG. 4 is a block diagram of a deflecting signal generating circuit according to the invention.
Figure 5:
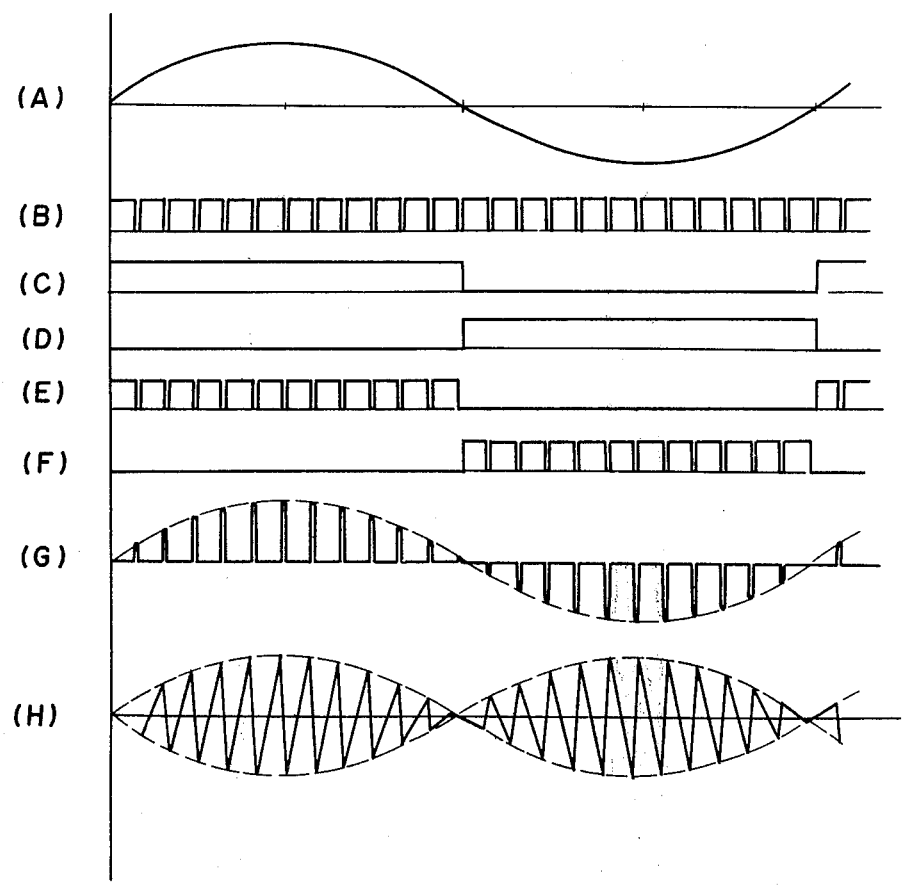
FIG. 5 shows waveforms in certain positions of the deflecting signal generating circuit of FIG. 4.

A deflecting signal generating circuit in one embodiment of the invention for satisfying the above conditions is shown in FIGS. 4 and 5. There will now be described the deflection system wherein the sawtooth waveform current passing through the horizontal deflecting coil is modulated in the case of horizontal deflection to vary the deflection from zero to a predetermined value and to vary the direction of deflection to two directions of positive and negative directions.

An envelope signal generator 48 for generating a modulation signal is oscillated by a sine wave to determine the value and direction of the sawtooth waveform current passed through the horizontal deflecting coil 41. The waveform at the output line 401 of the envelope signal generator 48 is shown in FIG. 5(A).

The output of the envelope signal generator 48 is input through the output line 401 to the envelope positive and negative finding circuit 49 to determine the polarity and is output to the output lines 402, 403. The output waveforms are the pulses of FIGS. 5(C), (D). The scan frequency generator 47 generates pulse trains for determining the scanning period of the horizontal deflection and determines the ratio of the scanning time to a fly-back time. The waveform at the output line 404 of the scan frequency generator 47 is shown in FIG. 5(B).

The output of the envelope positive and negative finding circuit 49 is input through the output line 402 and the output of the scan frequency generator 47 is input through the output line 404 to the positive gate circuit 50 so that the waveform of FIG. 5(C) is realized depending upon the waveform of FIG. 5(B). The output line 405 is connected to the output of the positive gate circuit 50. The output waveform is shown in FIG. 5(E).

The negative gate circuit 51 is similar to the positive gate circuit 50. The output of the envelope positive and negative finding circuit 49 is input through the output line 403 and the output of the scan frequency generator 47 is input through the output line 404 to the negative gate circuit 51 so that the waveform of FIG. (D) is realized depending upon the waveform of FIG. (B). The output line 406 is connected to the output of the negative gate circuit 51. The output waveform is shown in FIG. 5(F).

The positive switch circuit 52 is actuated for ON-OFF operation during the positive time of the envelope signal and is in the OFF state during the negative time of the envelope signal.

The negative switch circuit 53 is actuated for ON-OFF operation during the negative time of the envelope signal and is in the OFF state during the positive time of the envelope signal.

The deflecting coil 41 is connected in parallel to the resonation capacitor 42 and is connected through the coupling capacitor 43 and the choke coil 44 to the envelope signal generator 48. The contact between the choke coil 44 and the coupling capacitor 43 is connected through the diodes 54, 55 to the positive switch circuit 52 and is connected through the diodes 56, 57 to the negative switch circuit 53.

The positive switch circuit 52 consists of a forward current ON circuit 52A and a reverse current ON circuit 52B. The forward current ON circuit 52A and the reverse current ON circuit 52B are connected through the output line 405 to the positive gate circuit 50 to receive their inputs. The forward current ON circuit 52A and the reverse current ON circuit 52B are connected respectively to the cathode of the diode 54 and to the anode of the diode 55 at their outputs.

The negative switch circuit 53 is similar to the positive switch circuit 52 and consists of the reverse current ON circuit 53A and the forward current ON circuit 53B. The reverse current ON circuit 53A and the forward current ON circuit 53B are connected through the output line 406 to the negative gate circuit 51 to receive their inputs. The reverse current ON circuit 53A and the forward current ON circuit 53B are connected respectively to the anode of the diode 56 and the cathode of the diode 57.

When the envelope signal of FIG. 5(A) is positive, the forward current ON circuit 52A and the reverse current ON circuit 52B are turned on at the high level of the waveform of FIG. 5(E) of the input of the positive switch circuit 52 whereby the cathode of the diode 54 and the anode of the diode 55 are grounded. The forward current ON circuit 52A is a circuit for passing the current fed from the deflecting coil 41 through the diode 54 to ground and corresponds to the transistor 35 in the conventional deflection circuit of FIG. 3.

The diode 54 is to protect the forward current ON circuit 52A from the reverse withstand voltage when the envelope signal of FIG. 5(A) is negative. The reverse current ON circuit 52B is a circuit for passing the current fed from the deflecting coil 41 through the diode 55 to ground and is provided because the envelope signal of FIG. 5(A) cannot be negative when the anode of the diode 55 is grounded.

During the time of the high level of the waveform of FIG. 5(E) of the input of the positive switch circuit 52, the contact 507 between the choke coil 44 and the coupling capacitor 43 is in the ON state for passing the current to ground for both forward and reverse directions whereby the resonance circuit of the deflecting coil 41 and the resonance capacitor 42 is in its short-circuit state.

The voltage waveform at the non-grounded end of the deflecting coil 41 is shown in FIG. 5(G). The current which increases linearly proportionally to the envelope signal of FIG. 5(H) is passed to the deflecting coil 41 to deflect the scanning period.

When the waveform of FIG. 5(E) of the input of the positive switch circuit 50 is at its low level, both the forward current ON circuit 52A and the reverse current ON circuit 52B are in their OFF state whereby the resonance circuit of the deflecting coil 41 and the resonance capacitor 42 generates a high voltage as shown in FIG. 5(G) and the deflecting current of FIG. 5(H) during fly-back period scanning is fed to the deflecting coil 41.

When the envelope signal of FIG. 5(A) is negative, the negative switching circuit 53 is operational. The operation is similar to that of the positive switch circuit 52 and the diodes 54, 55 and the waveforms of voltage and current at the deflecting coil 41 are shown in FIGS. 5(G) and 5(H) in the latter parts.

The amplitude and direction of the deflection can be electrically controlled and a deflection having good linearity can be attained at high speed by using the above-mentioned deflecting signal generating circuit. The direction of the scanning line can be progressively turned by applying the deflecting signal to one of the deflecting coils and by also applying a signal having a 90° phase shift to the deflecting signal to the other deflecting coil which is then shifted 90° to the position of the former deflecting coil.

Figure 6:
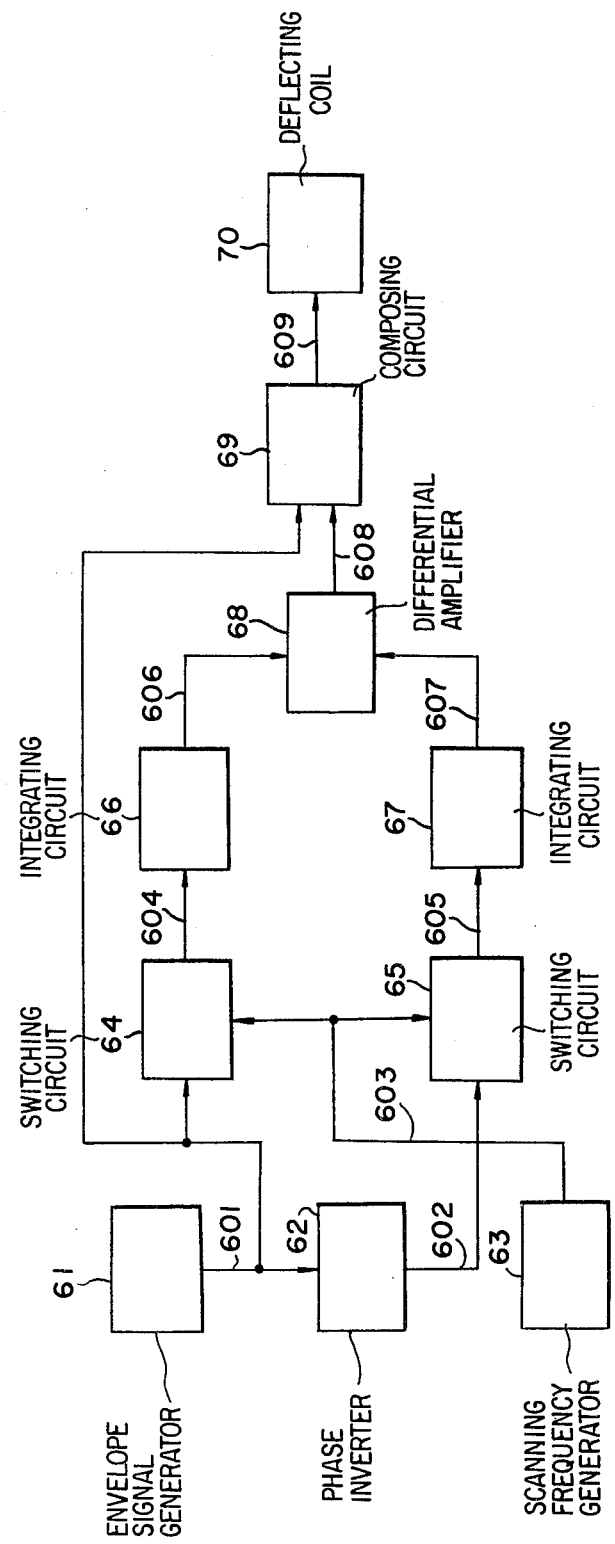
FIG. 6 is a block diagram of a deflecting signal generating circuit according to the invention.
Figure 7:
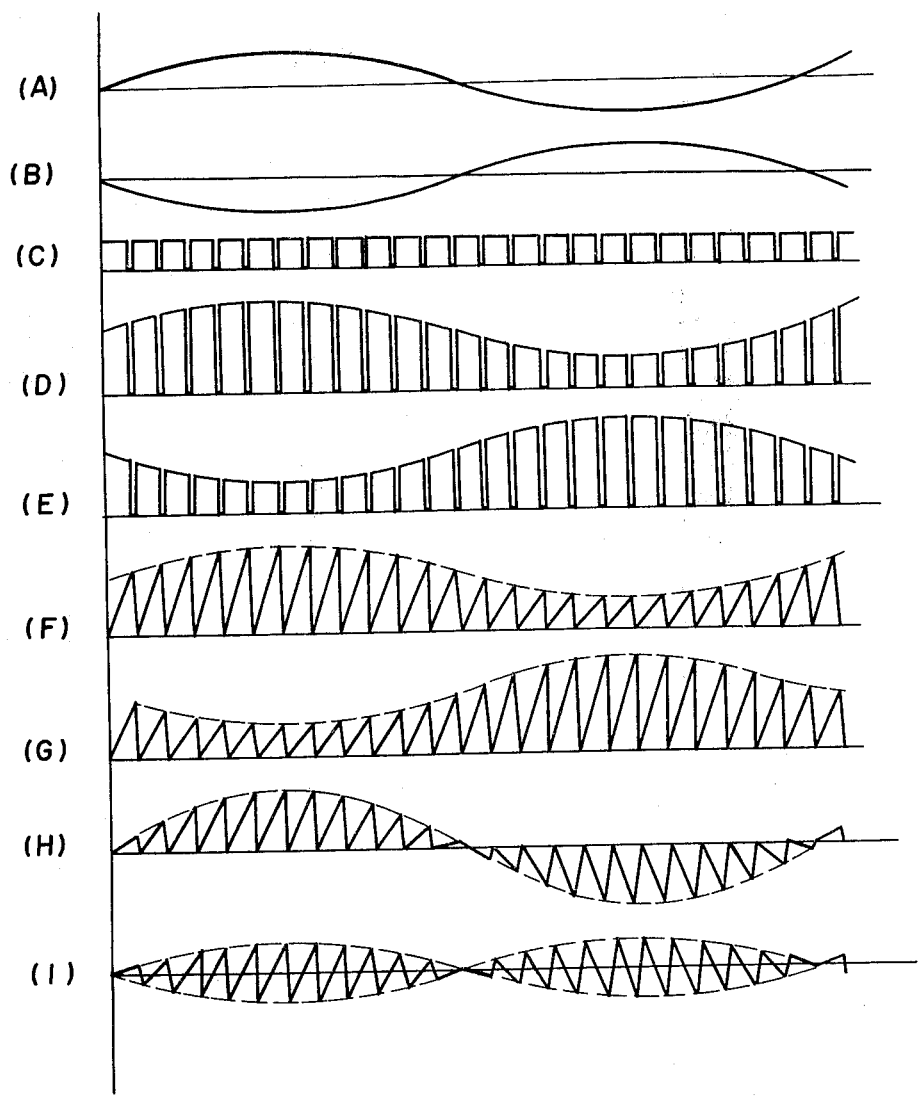
FIG. 7 shows waveforms in certain positions of the deflecting signal generating circuit of FIG. 6.

Referring to FIGS. 6 and 7, another embodiment wherein the scanning line is progressively turned and the deflecting circuit is effectively operated in a low frequency band (about a vertical deflecting frequency of a T.V.) will be described.

In this embodiment, the deflecting circuit also generates a deflecting current having the waveform shown in FIG. 7(I) which, for example, can be realized by a balanced modulation of a sawtooth wave by a sine wave. The envelope signal generator 61 for generating the modulation signal is oscillated by sine wave to determine the envelope of the horizontal deflecting coil sawtooth waveform current whereby the amplitude of the deflection is varied in sine form and the direction of the deflection is varied in both positive and negative directions.

The output of the envelope signal generator 61 is fed to the output line 601 and the waveform is shown in FIG. 7(A). The phase inverter 62 is connected through the output line 601 to the envelope signal generator 61 to output a signal having a 180° inverted phase on the output line 602. The waveform of the output is shown in FIG. 7(B).

The scanning frequency generator 63 generates pulse trains which determines the scanning period and the ratio of the scanning time to the fly-back time. The output of the scanning frequency generator 63 is fed to the output line 603. The waveform of the output is shown in FIG. 7(C).

The two inputs of the switching circuit 64 are connected through the output line 601 to the envelope signal generator 61 and the output line 603 to the scanning frequency generator 63 whereby the envelope signal of FIG. 7(A) is switched depending upon the pulse trains of FIG. 7(C) and the signal to which DC bias is applied for providing easy integral action is output to the output line 604. The switched waveform is shown in FIG. 7(B).

The switching circuit 65 is similar to the switching circuit 64. The two inputs of the switching circuit 65 are fed through the output line 602 from the phase inverter 62 and the output line 603 from the scanning frequency generator 63 to switch the envelope signal having the 180° inverted phase of FIG. 7B depending upon the pulse trains of FIG. 7(C) to output the output signal to the output line 605. The switched waveform is shown in FIG. 7(E).

The input of the integrating circuit 66 is fed through the output line 604 from the switching circuit 64. This circuit integrates the input signal to which DC bias is applied and outputs the signal to the output line 606. The integrated waveform is shown in FIG. 7(F).

The input of the integrating circuit 67 is connected through the output line from the switching circuit 65 and the integrated signal is output to the output line 607. The waveform of the integrated waveform is shown in FIG. 7(G).

The two inputs of the differential amplifier 68 are fed through the output line 606 from the integrating circuit 66 and the output line 607 from the integrating circuit 67 to amplify the voltage difference between the waveforms of FIGS. 7(F) and 7(G) to output the waveform of FIG. 7(H) to the output line 608.

The two inputs of the composing circuit 69 are fed through the output line 601 from the envelope signal generator 61 and the output line 608 from the differential amplifier 68 whereby the envelope signal of FIG. 7(A) is modulated by the signal of FIG. 7(H) and is composed to obtain the desired deflecting signal of FIG. 7(I) at the output line 609. The deflecting signal of FIG. 7(I) is fed to the deflecting coil 70.

The amplitude and direction of the deflection can be electrically controlled using the above-mentioned deflecting signal. The direction of the scanning line can be progressively turned by applying the deflecting signal to one of the deflecting coils and also applying a signal having a 90° phase shift to the other deflecting coil which is then shifted 90° to the position of the former deflecting coil. It is possible to attain an apparatus for providing a complete rotary image as shown in the following embodiment by using the deflecting circuits of the above-mentioned embodiments.

Referring to FIGS. 8–11, an embodiment having two pairs of horizontal and vertical deflecting coils around a video tube to which each of the deflecting signals is applied will now be described.

The first horizontal deflecting coil 81 and the first vertical deflecting coil 82 are similar to conventional ones as shown in FIG. 8. The second vertical deflecting coil 84 is disposed in a position to turn 90° so as to generate magnetic flux across the first vertical deflecting coil 82. The second horizontal coil 83 is disposed in a position to turn 90° so as to generate magnetic flux across the first horizontal deflecting coil 81.

When the two pairs of deflecting coils are used and the signal of the sawtooth waveform deflection current which is modulated in sine form is applied to the first horizontal and vertical deflecting coils 81, 82, if the signal having a 90° phase shift is applied to the second horizontal and vertical deflecting coils 83, 84, an image having a rotating direction of deflection can be obtained.

The deflecting signal generating circuit for applying the signals to two pairs of the deflecting coils will now be described.

The rotary signal generator 85 determines the rotary speed of linear scanning to oscillate the sine wave so as to realize constant rotary speed. The output of the rotary signal generator 85 is fed to the output line 805. The waveform of the output is shown in FIG. 11(A).

The input of the phase shifter 86 is fed through the output line 805 from the rotary signal generator 85 to shift by 90° the phase of the rotary signal of FIG. 11(A). The output of the phase shifter 86 is fed to the output line 806. The waveform of the output is shown in FIG. 11(B).

The horizontal deflecting frequency generator 87 is to generate pulse trains for the horizontal deflection. The output of the horizontal deflecting frequency generator 87 is fed to the output lines 807A, 807B. The waveforms of the voltage of the outputs are as shown in FIG. 11(C).

The vertical deflecting frequency generator 88 generates pulse trains for vertical deflection to determine the scanning period and the ratio of the scanning time to the fly-back time. The output of the vertical deflecting frequency generator 88 is connected to the output line 808A, 808B. The waveforms of the voltage of the outputs are as shown in FIG. 11(D).

The two inputs of the first horizontal deflecting coil driving circuit 89 are fed through the output line 805 from the rotary signal generator 85 and the output line 807A from the horizontal deflecting frequency generator 87 whereby the first horizontal deflecting coil driving signal of FIG. 11(E) is output to the output line 809 by using a circuit similar to the above-mentioned deflecting signal generating circuit. The driving signal of the first horizontal deflecting coil driving circuit 89 is applied through the output line 809 to the first horizontal deflecting coil 81.

The two inputs of the first vertical deflecting coil driving circuit 91 are fed through the output line 805 from the rotary signal generator 85 and the output line 808A from the vertical deflecting frequency generator 88 whereby the first vertical deflecting coil driving signal of FIG. 11(G) is output to the output line 811 by using a circuit similar to the above-mentioned deflecting signal generating circuit. The driving signal of the first vertical deflecting coil driving circuit 91 is applied through the output line 811 to the first vertical deflecting coil 82.

The two inputs of the second horizontal deflecting coil driving circuit 90 are fed through the output line 806 from the phase shifter 86 and the output line 807B from the horizontal deflecting frequency generator 87 whereby the second horizontal deflecting coil driving signal of FIG. 11(F) is output to the output line 810 by using a rotary signal having a 90° phase shift as shown in FIG. 11(B) and the horizontal deflecting frequency signal of FIG. 11(C) and by using a circuit similar to the above-mentioned deflecting signal generating circuit. The driving signal of the second horizontal deflecting coil driving circuit 90 is applied through the output line 810 of the second horizontal deflecting coil 83.

The two inputs of the second vertical deflecting coil driving circuit 92 are fed through the output line 806 from the phase shifter 86 and the output line 808B from the vertical deflecting frequency generator 88 whereby the second vertical deflecting coil driving signal of FIG. 11(H) is output to the output line 812 by using the rotary signal having a 90° phase shift as shown in FIG. 11(B) and the vertical deflecting frequency signal of FIG. 11(D) and by using a circuit similar to the above-mentioned deflecting signal generating circuit. The driving signal of the second vertical deflecting coil driving circuit 92 is applied through the output line 812 to the second vertical deflecting coil 84.

The linear progressive rotary scanning operation conducted by two pairs of horizontal and vertical deflecting coils connected to the video tube will now be described.

In the waveforms of FIG. 11, the waveforms (F), (H) are in zero deflection at the zero time on the time axis and the second horizontal deflecting coil 83 and the second vertical deflecting coil 84 are not in deflecting operation. The waveforms (E), (G) are in the maximum condition of deflection in the positive direction and the normal picture scanning operation is conducted by the first horizontal deflecting coil 81 and the first vertical deflecting coil 82.

At the time $t = t_1$ of the time axis, the sawtooth waveform current is fed to the first horizontal deflecting coil 81 with an amplitude of 0.7 of the waveform E at $t = 0$. The sawtooth waveform current is fed to the first vertical deflecting coil 82 with an amplitude of 0.7 of the waveform (E) at $t = 0$. The sawtooth waveform current is fed to the second horizontal deflecting coil 83 with an amplitude of 0.7 of the waveform (F) at $t = t_2$. The sawtooth waveform current is fed to the second vertical deflecting coil 84 with an amplitude of 0.7 of the waveform (F) at $t = t_2$.

The second horizontal and vertical deflecting coils 83, 84 are wound at a 90° phase shift to the first horizontal and vertical deflecting coil 81, 82. Accordingly, the vector of force to the electron beam formed by these deflecting currents is at 45° shifted from the state at $t = 0$. At $t = t_2$, the deflection is at the direction to 90° shifted from the state at $t = 0$.

As stated above, in accordance with the invention, the linear progressive rotary scanning operation can be attained by using two pairs of horizontal and vertical deflecting coils and applying the driving signals of FIGS. 11 (E), (F), (G), (H).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A data reading apparatus comprising:
a TV camera having a deflecting mechanism for reading codified data,
a deflecting signal generating circuit for generating a signal to be applied to the deflecting mechanism,
the deflecting signal generating circuit comprising:
an envelope signal generator,
a scan frequency generator,
an envelope positive and negative finding circuit,
a positive gate circuit,
a negative gate circuit,
a positive switch circuit comprising a forward current on circuit and a reverse current on circuit,
a negative switch circuit comprising a reverse current on circuit and a forward current on circuit,
a first diode,
a second diode,
a third diode,
a fourth diode,
a choke coil,
a coupling capacitor,
a resonation capacitor,
a horizontal deflecting coil,
means connecting the envelope signal generator to a first terminal of the choke coil and to the input of the envelope positive and negative finding circuit,
means connecting the scan frequency generator to a second input of the positive gate circuit and to a first input of the negative gate circuit,
means connecting a first output of the envelope positive and negative finding circuit to a second input of the negative gate circuit,
means connecting a second output of the envelope positive and negative finding circuit to a first input of the positive gate circuit,
means connecting the output of the positive gate circuit to the input of the forward current on circuit of the positive switch circuit and to the input of the reverse current on circuit of the positive switch circuit,
means connecting the output of the negative gate circuit to the input of the reverse current on circuit of the negative switch circuit and to the input of the forward current on circuit of the negative switch circuit,
means connecting the output of the forward current on circuit of the positive switch circuit to the cathode of the first diode,
means connecting the output of the reverse current on circuit of the positive switch circuit to the anode of the second diode,
means connecting the output of the reverse current on circuit of the negative switch circuit to the anode of the third diode,
means connecting the output of the forward current on circuit of the negative switch circuit to the cathode of the fourth diode,
means connecting a second terminal of the choke coil to the anode of the first diode, to the cathode of the second diode, to the cathode of the third diode, to the anode of the fourth diode and to a first terminal of the coupling capacitor,
means connecting the second terminal of the coupling capacitor to the resonation capacitor and to the horizontal deflecting coil,
means connecting the resonation capacitor and the horizontal deflecting coil in parallel.

2. A data reading apparatus comprising:
a TV camera having a deflecting mechanism for reading codified data,
a deflecting signal generating circuit for generating a signal to be applied to the deflecting mechanism,
the deflecting signal generating circuit comprising:
an envelope signal generator,
a phase inverter,
a scanning frequency generator,
a first switching circuit,
a second switching circuit,
a first integrating circuit,
a second integrating circuit,
a differential amplifier,
a composing circuit,
a deflecting coil,
means connecting the output of the envelope signal generator to the input of the phase inverter, to a first input of the first switching circuit and to a first input of the composing circuit,
means connecting the output of the phase inverter to a second input of the second switching circuit,
means connecting the output of the scanning frequency generator to a second input of the first switching circuit and to a first input of the second switching circuit,
means connecting the output of the first switching circuit to the input of the first integrating circuit,
means connecting the output of the second switching circuit to the input of the second integrating circuit,
means connecting the output of the first integrating circuit to a first input of the differential amplifier, means connecting the output of the second integrating circuit to a second input of the differential amplifier, means connecting the output of the differential amplifier to a second input of the composing circuit, means connecting the output of the composing circuit to the input of the deflecting coil.

3. A data reading apparatus comprising:
a TV camera having a deflecting mechanism for reading codified data,
a deflecting signal generating circuit for generating a signal to be applied to the deflecting mechanism, the deflecting signal generating circuit comprising:
a rotary signal generator,
a phase shifter,
a first horizontal deflecting coil driving circuit,
a horizontal deflecting frequency generator,
a second horizontal deflecting coil driving circuit,
a first vertical deflecting coil driving circuit,
a vertical deflecting frequency generator,
a second vertical deflecting coil driving circuit,
a first horizontal deflecting coil,
a second horizontal deflecting coil,
a first vertical deflecting coil,
a second vertical deflecting coil,
means connecting the output of the rotary signal generator to the input of the phase shifter, to a first input of the first horizontal deflecting coil driving circuit and to a first input of the first vertical deflecting coil driving circuit,
means connecting the output of the phase shifter to a second input of the second horizontal deflecting coil driving circuit and to a second input of the second vertical deflecting coil driving circuit,
means connecting the output of the first horizontal deflecting coil driving circuit to the input of the first horizontal deflecting coil,
means connecting a first output of the horizontal deflecting frequency generator to a second input of the first horizontal deflecting coil driving circuit,
means connecting a second output of the horizontal deflecting frequency generator to a first input of the second horizontal deflecting coil driving circuit,
means connecting the output of the second horizontal deflecting coil driving circuit to the input of the second horizontal deflecting coil,
means connecting the output of the first vertical deflecting coil driving circuit to the input of the first vertical deflecting coil,
means connecting a first output of the vertical deflecting frequency generator to a second input of the first vertical deflecting coil driving circuit,
means connecting a second output of the vertical deflecting frequency generator to a first input of the second vertical deflecting coil driving circuit,
means connecting the output of the second vertical deflecting coil driving circuit to the input of the second vertical deflecting coil.

* * * * *